(12) United States Patent
Karem

(10) Patent No.: US 6,584,382 B2
(45) Date of Patent: Jun. 24, 2003

(54) INTUITIVE VEHICLE AND MACHINE CONTROL

(76) Inventor: Abraham E. Karem, 29312 Wood Canyon Rd., Silverado, CA (US) 92676

( * ) Notice: Subject to any disclaimer, the term of this patent is extended or adjusted under 35 U.S.C. 154(b) by 0 days.

(21) Appl. No.: 09/861,457

(22) Filed: May 17, 2001

(65) Prior Publication Data

US 2002/0022909 A1 Feb. 21, 2002

Related U.S. Application Data

(60) Provisional application No. 60/205,007, filed on May 17, 2000.

(51) Int. Cl.[7] .................................................. G06F 7/00
(52) U.S. Cl. ............................................................... 701/3
(58) Field of Search .............................. 701/3, 23, 24, 701/120; 340/958; 244/114 R; 342/23

(56) References Cited

U.S. PATENT DOCUMENTS

| 4,038,640 | A | | 7/1977 | Lee et al. ................... 364/200 |
|---|---|---|---|---|
| 4,249,159 | A | * | 2/1981 | Stasko ......................... 340/26 |
| 5,156,229 | A | | 10/1992 | Yasui et al. ................. 180/140 |
| 5,196,998 | A | | 3/1993 | Fulton ..................... 364/167.01 |
| 5,675,661 | A | * | 10/1997 | Richman et al. ............ 382/104 |
| 5,971,325 | A | | 10/1999 | Gold et al. |
| 6,023,665 | A | * | 2/2000 | Millgard ..................... 702/151 |

FOREIGN PATENT DOCUMENTS

| EP | 0 419 897 A2 | 4/1991 |
|---|---|---|
| EP | 0 976 879 A1 | 2/2000 |

* cited by examiner

Primary Examiner—Yonel Beaulieu
(74) Attorney, Agent, or Firm—Christie, Parker & Hale, LLP

(57) ABSTRACT

A control machine/operator interface and a method for controlling complex machines or moving vehicles are provided. The method uses a high level of automation and the man-machine interface to achieve an intuitive control method and a substantial reduction in required operator skill level and training. The method also makes the operation of such machine or vehicle virtually the same when the operator is in the machine or vehicle as when the machine or vehicle is controlled from a remote location.

24 Claims, 6 Drawing Sheets

INTUITIVE VEHICLE AND MACHINE CONTROL

CROSS-REFERENCE TO RELATED APPLICATION

This application is based upon and claims priority on U.S. Provisional Application No. 60/205,007 filed on May 17, 2000, the contents of which are fully incorporated herein by reference.

FIELD OF THE INVENTION

This invention relates to a method for operating complex machines and moving vehicles using a high level of vehicle automation and operator controls and displays to achieve a substantial reduction in operator required skill level and training.

BACKGROUND OF THE INVENTION

Complex machines and moving vehicles (for example airplanes or helicopters) are either automatically controlled by programmed computers or require highly skilled well-trained operators to operate safely. Remotely operated machines or vehicles also require different skill for operation than do locally operated machines or vehicles, therefore requiring different lengthy training and in most cases a different set of skills.

The addition of an automatic mode of control to manually controlled machines or vehicles, in the past 50 years, did not revolutionize the man-machine interface in such a way that operating such machines or vehicles in operator guided mode is dramatically simpler. For example, while the operation of an airplane or a helicopter can be fully automatic when the pilot engages the autopilot, the pilot skill level and training required for safe operation of such airplane or helicopter are not significantly reduced as compared to what they were in the 1950s or 1960s even though most advanced aircraft use automatic stabilization and other lower levels of automatic controls when they are manually controlled or guided by the operator.

The complex machines and complex moving vehicles are designed to have a man-machine interface (controls and displays) which is largely specific to the machine or vehicle, therefore requiring lengthy training and operator testing and screening specific to the qualification for the operation of the particular machine or vehicle. For example, even after thousands of hours of piloting a particular jet transport, for example a Boeing 737, the pilot cannot qualify for piloting a very similar Airbus 320 without lengthy training, mainly because the controls and displays of the two aircraft are different.

The high skill levels and lengthy training required to operate complex machines and aircraft have severe negative effects of reducing the safety levels, increasing the cost of operation and limiting the market for such machines and vehicles.

The current market for airline pilots is such that the military is not successful in recruiting candidates with adequate skill level, and then training and screening them as military pilots at the rate they leave military service to join airline service. A relaxation of the required skill level and of training period should relieve such pilot shortage situation.

Remotely operated vehicles or Unmanned Vehicles (UVs) found ever increasing use mostly by the military over the period 1950–2000 and are expected to find substantial commercial uses. These vehicles include Unmanned Aerial Vehicles (UAVs), Unmanned Ground Vehicles (UGVs) and Unmanned Underwater Vehicles (UUVs). The market for UAVs alone has reached the two billion dollars per year level. Like manned vehicles, these UVs are either completely automated or autonomous (like cruise missiles) or they offer a mode of remote operator control. When completely automated or autonomous, the UVs offer no operational versatility once they are programmed and launched. When a mode of remote operator control is offered, the mission of the UV may be altered by the operator as the mission progresses to better suit the developing needs as new knowledge is gained from the vehicle operation or from other sources or as the situation outside the vehicle develops.

The complexity of operation or guidance by a remote operator is such that the autonomous vehicles, such as terrain-following cruise missiles, were perfected in a relatively short time, while the acceptance of UVs with remote operation lagged behind mainly because of the skill levels and training required and the resultant unacceptable vehicle losses due to operator errors.

Currently, the serious accident rates of unmanned aircraft with any mode of operator guidance is approximately 3,000 fold higher than that of a transport aircraft in airline service. The fact that this large gap between loss rates exists, although the UAVs are very sophisticated (cost 1–20 million dollars each) and the military users carefully select, train and screen operators, severely limits the use of such UAVs to missions that the risk to a manned aircraft is unacceptable.

The current situation described above applies to the operation of all machinery and vehicles which usually require quick operator reactions in response to dynamic situations in order to achieve both operating safety and operating efficiency (machine or vehicle productivity). The high operator skill level, lengthy training and high demand for operator currency (recent operation of the same machine or vehicle) are required to establish the "proficiency" of almost flawless quick operator reaction in a complex man-machine interface (controls and displays) unique to the particular machine.

To judge the demands of skill level and proficiency several aspects may be considered such as:
  a. The number of manual controls which are critical to safe operation;
  b. The operator control/reaction speed required for efficient machine operation;
  c. The number of other, non safety critical, controls and the frequency of operator actions needed.

To better understand the above description of the current situation, we can examine the family automobile. We may define only three controls e.g., steering, acceleration, and brake, as safety critical controls. The driver reaction speed required for safe driving is dependent on the car speed, traffic, road (straight/winding, blind turns, etc.) and visibility/weather conditions. Each one of these driving conditions above or a combination of these and other factors (like car qualities) can directly affect the driving safety and the demands on driver skills and proficiency.

Early in the last century of automotive development the industry standardized the above listed three automobile safety critical controls. But, the industry took the liberty of varying all other driver-automobile interfaces ranging from parking brake to adjustment of radio and from display of speed to display of low oil pressure. While these are non safety critical controls and displays, they may significantly affect either safety of a driver looking for the wiper controls when rain starts while driving a rented car or affect the efficiency of operation, e.g. stopping by the side of the road to find the controls for the wiper.

It is important to examine the effects of three technologies which became widespread in the 1980's and 1990's:

a. Automation of operation of machinery and vehicles
b. Computerized displays and controls
c. Use of computer networks to relay manual controls.

The automation of operation of systems or subsystems of machinery and vehicles can substantially reduce the workload of the operator and result in safer operation and/or higher operator response rate. For example, anti-skid brakes and traction control in an automobile can provide for safer operation at more marginal driving conditions and/or with a less skilled or lower proficiency driver. Even the automation of the non safety critical controls can free the operator to better perform the more important controls. For example, rain activated wipers, speed ("cruise") control, automatic air conditioning controls and voice warnings can help the driver concentrate on the road conditions instead of scanning the displays or operating the manual controls.

The widespread use of computers makes the public more proficient with computer type displays and controls including digital and graphic displays, menu driven displays and controls, and activation of controls displayed on computer screens.

Even when the modern machine or vehicle controls are not automated and the man-machine interface is based on manual control, by the operator, of discrete control functions, in many larger and/or more expensive machines or vehicles, computers and computer networks are used to relay the manual control to the controlled part of the system.

For example, in large jet transport aircraft there are less and less direct mechanical, hydraulic or electric control linkages between the pilot and the controlled aircraft subsystems (aerodynamic control surfaces, landing gear, engine, fuel transfer system, etc.) Instead, a network of computers relays the pilot messages, either continuous controls or discrete on/off, to the subsystem being controlled. The subsystems are more frequently controlled by separate computers or micro-controllers so that a computer connected to the pilot actions (say central computer or cockpit computer) is networked with the computers of the subsystems. The network can be either through electric conductors (copper wires) or through fiber-optics. The first is called "fly-by-wire" in the aviation vernacular and the latter "fly-by-light."

In spite of the widespread use of automation, computer displays and controls and the use of computer networks listed above, the modern complex machines and vehicles substantially demand the same levels of operator skill, training and "currency" as those before such innovations were introduced. Furthermore, the introduction of such innovations did not bring any significant standardization of operator interface to complex machines and vehicles to help reduce the level of training required for the operation of the various specific machines.

A detailed study of the operation of complex machines and vehicles renders the following:

a. Very few controls are critical to the safety and productivity of the operation. These controls are continuously modulated by the operator and not a discrete value selection (in an automobile these controls are like steering or brake and not like gear selection of a manual transmission);
b. The critical controls are mostly related to the positioning of the vehicle or of part of the machine (the cutting tool in a metal machining operation, for example);
c. The vast majority of the operation functions are not critical to the safety of operation and are individually simpler control functions than the critical controls and therefore may be easier to completely automate and such automation may have very little effect on the safety and efficiency of operation.

A study of the general population in the more developed countries proves that most people are comfortable and trusting of machines and vehicles especially if the controls are few and very intuitive. Furthermore, most people are very comfortable if non safety-critical control functions are carried automatically without any visibility to the operator (for example, the computer control of all engine systems). Most people are comfortable when safety-critical control functions are automated if they are not controlling the travel path of the vehicle (speed "cruise" control, anti-skid, traction control, etc.)

SUMMARY OF THE INVENTION

The present invention provides man/machine interface and a method for controlling complex machines and moving vehicles. The man/machine interface and method of the present invention provide for:

a. Intuitive control which is easier for the operator to learn and to maintain a high proficiency level;
b. Lower operator workload which improves safety and machine-operator productivity and efficiency;
c. Substantial commonality and standardization of machine or vehicle operation which reduces the required operator training and provides for qualifications of the operator for widely varying machines and vehicles;
d. Standardization of the effects of the movements of the operator's hand and foot controls over a wide range of machines or vehicles;
e. Make the operation of machines and vehicles the same whether the operator is in the vehicle, close to the machine or in a remote location out of sight.

DETAILED DESCRIPTION

An operator-machine interface is provided for intuitively controlling various types of vehicles and machines which provides commonality to the operation of the vehicles and machines and which makes the operation of the vehicles and machines the same whether the operator is in the vehicle, close to the machine or in a remote location away from the vehicle or machine.

Because the present invention is applicable to all machines and vehicles, it is better understood when applied to a specific example of a category of vehicles. While an automobile is easier to operate safely than an aircraft, it is more difficult to operate completely automatically in the various roads and traffic conditions without a substantial advancement of sensors technology and/or investment in transportation infra-structure. The aircraft can be equipped for operation completely in automatic control mode mainly because most airspace is not congested and the Air Traffic Control (ATC) system is available to allocate space for various aircraft and resolve any traffic conflicts.

In order to best demonstrate the present invention the most complete and the most challenging group of vehicles is chosen, that of all aircraft and all rotorcraft, both manned and unmanned. With the present invention, a single operator may operate both a complex vehicle, e.g., a rotorcraft and a sophisticated payload. Currently, this task requires two highly skilled professionals with long individual training and lengthy joint training as a team. Furthermore, operation of a complex vehicle currently requires a roomful of displays and controls either on the manned vehicle (cockpit) or on the ground (for the UAV).

Figure 1A:
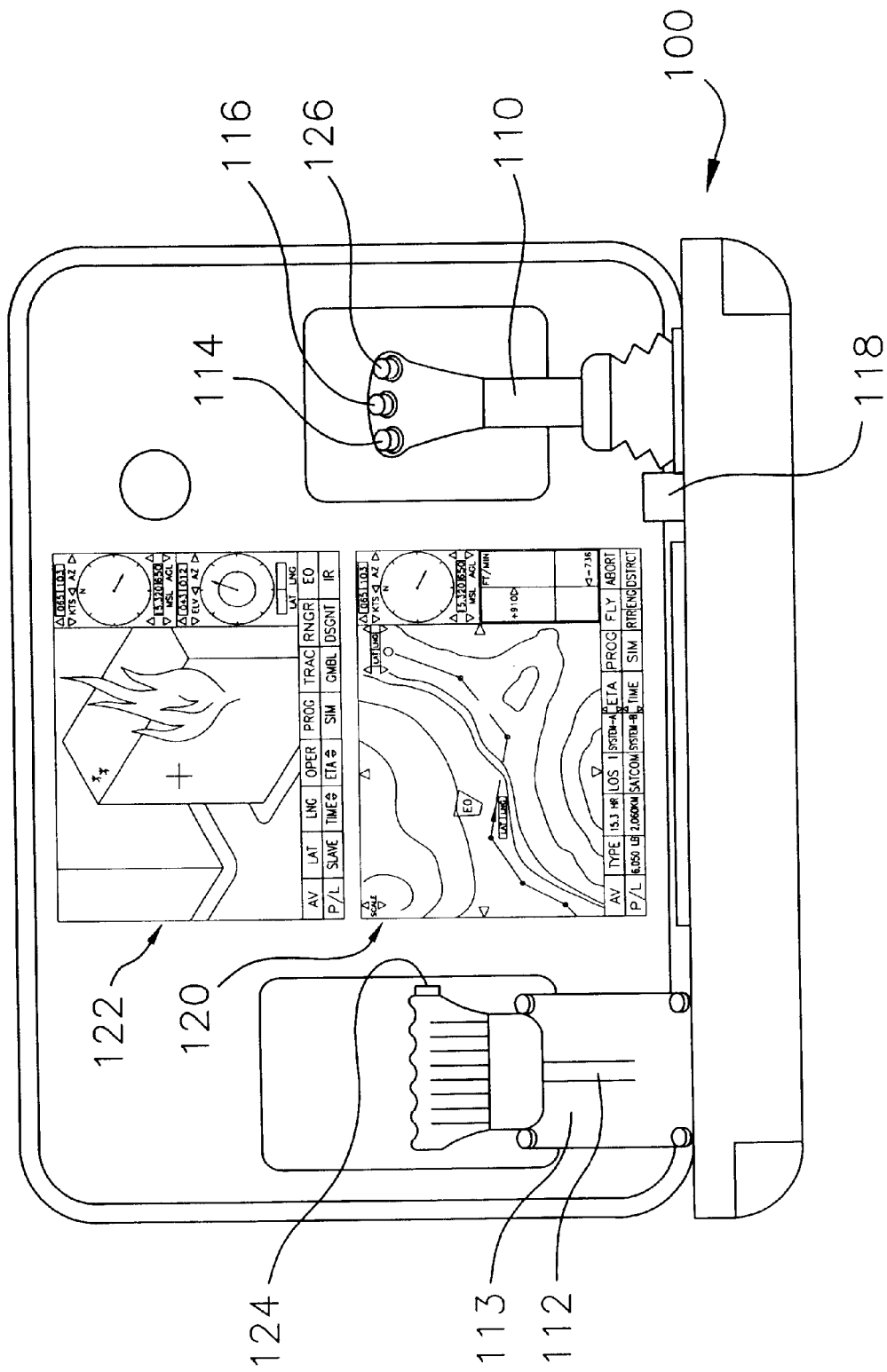
FIG. 1A is a front view of an exemplary embodiment control unit of the present invention.
Figure 1B:
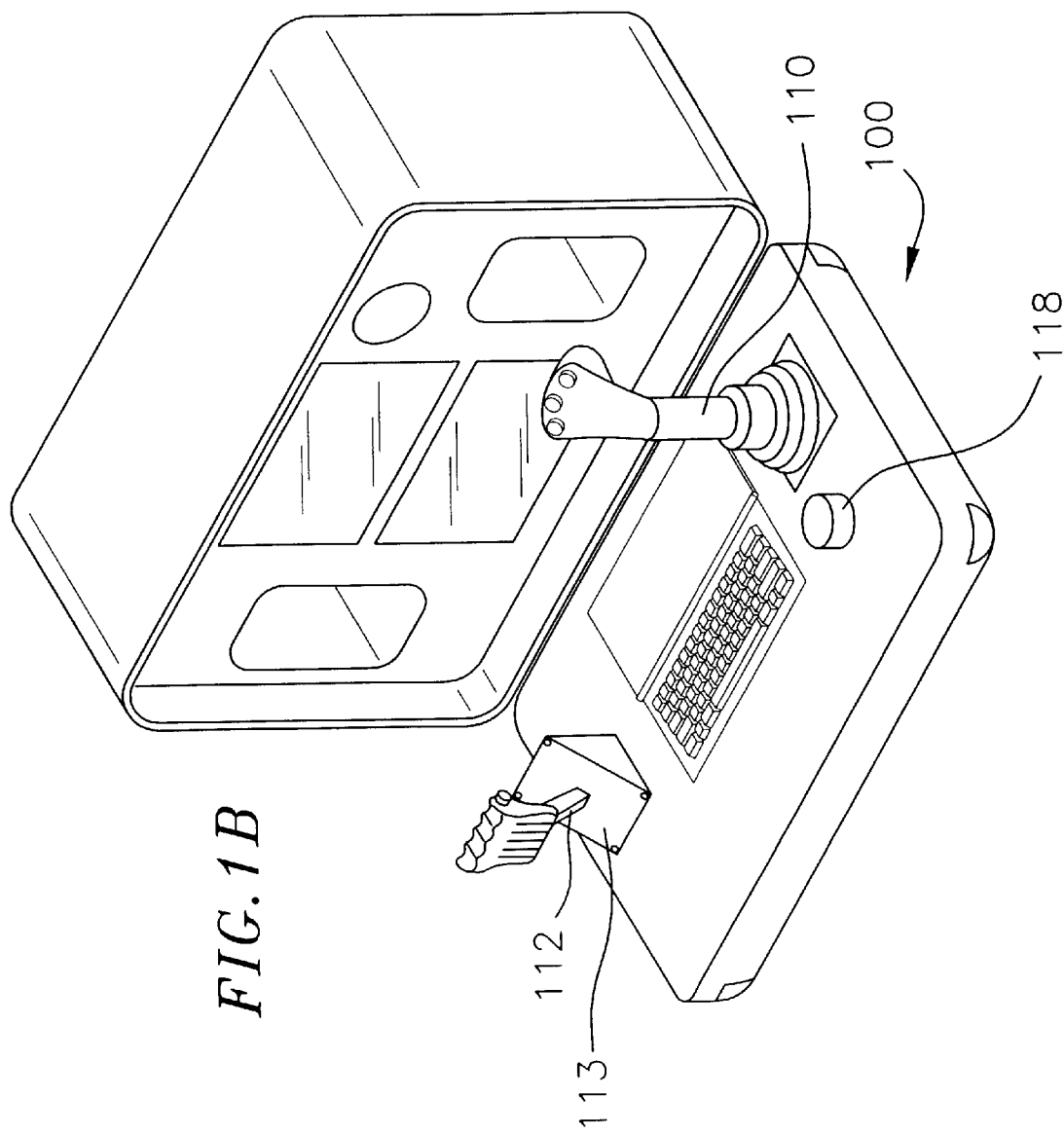
FIG. 1B is a perspective view of the control unit shown in FIG. 1A.

Using the current invention, the operator-machine interface is reduced to one interface unit 100 as for example shown in FIGS. 1A and 1B operated by a substantially less skilled operator with short training. The unit may be small and portable, as for example the size of a briefcase as shown in FIGS. 1A and 1B, or even the size of a notebook. The system can optionally be grown to two or more control units for two or more operators in a modular "building block" fashion. The manned aircraft operator can take such a personal control unit and couple it to the "empty cockpit" of any advanced aircraft, equipped for the present invention, to completely operate the aircraft and its payload. Both hardware and software protections may be used to limit such "plug and fly" to authorized personnel at the approved time.

Figure 2:
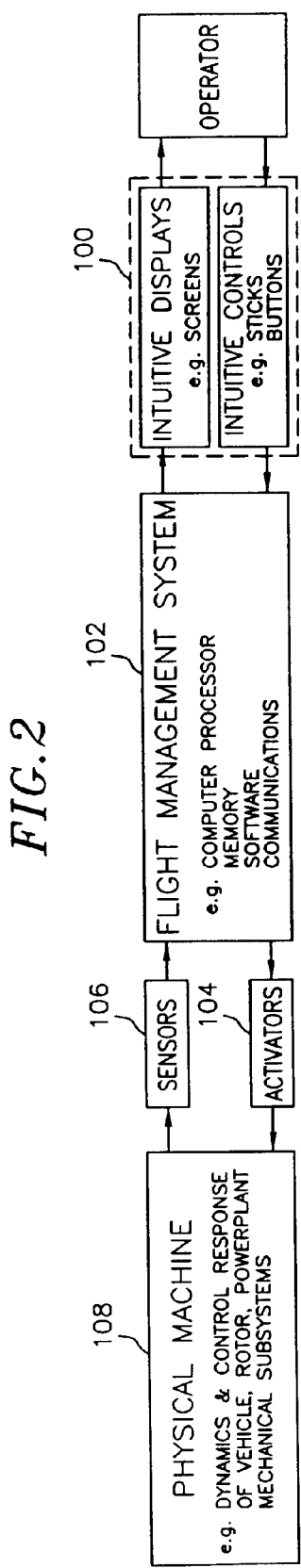
FIG. 2 is a schematic of the interaction between an exemplary embodiment control unit of the present invention and systems of a rotorcraft.

In the case of a rotorcraft or aircraft, the unit 100 which includes at least a display and controls is coupled to the cockpit of the rotorcraft or aircraft. When coupled to a rotorcraft or aircraft, the unit 100 is coupled to the rotorcraft or aircraft Flight Management System (FMS) 102. The unit may be coupled via wires, or fiber optics or may be wireless coupled to the FMS. For convenience, the term "releasably coupled" is used herein to denote coupling to a vehicle or machine or FMS using wires, fiber optics, or wireless connections that allow for decoupling from vehicle, machine or FMS when so desired. The unit sends and receives information from the FMS for controlling the rotorcraft or aircraft. The FMS activates the appropriate actuators 104 in response to information it receives from the unit 100 and from sensors 106 coupled to the rotorcraft or aircraft 108 for controlling the operation of the rotorcraft or aircraft(FIG. 2). The control unit is equipped with the appropriate software and hardware for communicating with the FMS. The software may be adaptable for communicating with the various types of FMS incorporated in different types of flying vehicles. In an alternate embodiment, the software may run on the FMS.

The same control units could be used to fly a UAV and operate its payload. In such case the unit will be connected to the UAV ground communication and control equipment. Furthermore, the same control unit, when not used for flight operations, can be used as a complete operator training simulator.

In an alternate embodiment, the interface unit may be permanently coupled to a vehicle or machine using wires, fiber optics or wireless connections.

Application to a Rotorcraft

A rotorcraft is the most difficult air vehicle to manually control. Unlike a fixed-wing aircraft, which flies only forward "nose first", a helicopter is capable of hovering in one spot and flying in all directions including sideways and backwards. A rotorcraft can hover and land almost anywhere, therefore requiring higher skill and training level for operation than a forward flight, take-off and landing fixed-wing aircraft.

There are five flight-safety critical controls on a rotorcraft that are continuously manipulated during operation. These are:

a. Rotor pitch which controls the tilt of the rotor(s) in forward-aft direction and as a result the rotorcraft acceleration in that direction. The forward-aft speed and forward-aft hovering position are indirect results;

b. Rotor roll which controls the sideways tilt of the rotor(s) (banking left or right) and as a result the rotorcraft acceleration to the left or right;

c. Collective which controls the magnitude of the total lift of the rotor(s) and as a result the rotorcraft acceleration upward or downward. The rate of climb or descent and the altitude of flight are indirect results;

d. Rudder which controls the yaw acceleration of the rotorcraft fuselage to left or right, the fuselage turn rate to left or right and the fuselage pointing direction are indirect results; and e. Throttle which controls the engine power level and the rotor rotational speed in Revolution Per Minute (RPM)

Even the simplest of rotorcraft has a long list of displays (dedicated meters and lights) and controls (dedicated switches and multi-position selectors) other than the above listed controls such as a rotor disengaging clutch, rotor brake, engine mixture control, etc. As a result, the minimum skill and training levels required for a simple rotorcraft pilot are vastly higher than, for example, those for driving an automobile and this fact substantially limits the popularity of and market size for rotorcraft.

In order to reduce rotorcraft piloting workload, the more expensive rotorcraft use autopilots of various levels of automation, starting with an automated throttle to control the RPM of the rotor at the desired level (usually at a constant RPM close to 100% RPM). More advanced autopilots use gyroscopes to provide automatic stabilization and automatic control of forward flight. None of these autopilots changes the pilot's basic interface with the rotorcraft. The pilot needs to perform all the difficult control functions from engine start through takeoff and to achieve the desired flight condition before the autopilot is engaged.

A very few unmanned rotorcraft have achieved truly autonomous operation from take-off to landing including the completely automatic control of all rotorcraft subsystems (engine, fuel transfer, lights, etc.) under a pre-programmed flight mode.

The present invention takes a completely different novel approach to operating a rotorcraft. The rotorcraft is under fully automatic control, therefore, providing a completely autonomous flight mode (no operator intervention) if the operator so desires. Several operator controls (called "operator guidance") are provided which fully utilize the automatic control system, i.e., the autopilot system of the rotorcraft to substantially make the rotorcraft automated controls perform as the operator desires without the skill and training level necessary for directly controlling the rotorcraft through the traditional manual controls. With the present invention, the rotorcraft may have no manual control mode in which the operator directly controls the main controls (rotor pitch, collective, throttle, etc.)

The exemplary embodiment control unit, i.e., man-machine interface 100 of the present invention provides for a main "Operator Guidance" control system which is three-axis "Velocity Vector" control, by which the operator controls, at the higher control level, the magnitude and direction of the velocity of the rotorcraft.

The control system comprises a first control column 110 which in the exemplary embodiment shown in FIG. 1A is a right-hand short control column ("stick" in aviation vernacular) in the exemplary embodiment is spring-loaded to center. The right control stick provides for horizontal velocity control. Moving the stick forward causes the vehicle to fly at a forward flight speed linearly proportional to the stick deflection. Aft deflection provides proportional backward speed (tail slide in aviation vernacular). If the stick is centered (hands-off) the rotorcraft is automatically controlled to minimum forward speed which is zero for rotorcraft (forward-aft hover). Moving the stick left or right provides proportional left and right side velocity. If the stick is centered (hands-off) the rotorcraft is controlled to zero side velocity.

A second controller 112 is a left-hand controller or stick in the exemplary embodiment shown in FIG. 1A and is set to move at an angle to slide forward-up or aft-down directions. In a preferred embodiment, the left controller is not spring loaded to center, however, a center indent may be used to indicate to the operator the center position. In the exemplary embodiment, the left-hand controller moves forward-up along an incline 113 and aft-down along the same incline. The left-hand controller provides rotorcraft vertical up velocity (rate of climb) linearly proportional to the forward-up deflection; and vertical down velocity (rate of descent) proportional to the aft-down deflection of the controller. Moving the controller to the center indent provides zero vertical velocity. Therefore, doing so and releasing both right and left controllers provide a complete rotorcraft hover.

In an alternate embodiment, the unit can be equipped with a numeric and/or alpha-numeric pad for entering data.

In an exemplary embodiment, the exemplary embodiment control unit 100 is used on a rotorcraft being equipped with FMS 102 which includes Inertial Navigation System with Global Positioning System (INS/GPS) type navigation. The "Velocity Vector" control provided by the control unit is all relative to earth GPS coordinates. All rotorcraft corrections for wind and for wind gusts are made by the automatic control system of the FMS.

The FMS is programmed with all flight control qualities of the particular rotorcraft design including all flight control limits (maximum forward speed, maximum side speed, etc.) as a function of rotorcraft weight and flight altitude, or using a direct measurement of flight control parameters which define such limits (rotor lift, rotor roll movement, etc.) The FMS automatically provides all flight control protections against exceeding rotorcraft safe operation limits. Such limits are mostly based on rotorcraft movement relative to the air mass. The operator does not need to be aware of such limits and all operator controls are relative to earth coordinates. If a certain Velocity Vector command exceeds the rotorcraft limits, the FMS will provide the closest available Vector and display the limit(s). The operator can then choose to accept the provided Vector or change the total commanded Vectors to achieve a more desirable result (for example, turn the rotorcraft to land into the wind to avoid a low tail slide limit).

The right-hand 110 controller carries two momentary (spring-loaded) switches 114, 116 to provide Velocity Vector trims in forward-aft and left-right. By moving the controller to achieve the desired Horizontal Velocity, pressing one switch 114, bringing the controller to the center and releasing the switch the operator achieves a hands-off operation at the new desired Horizontal Velocity. The second switch 116, when pressed, returns the trim to zero Horizontal Velocity (hands-off hover).

The fuselage azimuth direction is controlled by two alternate methods. One is the direct fuselage azimuth angle control by a large rotating knob 118 as for example shown in FIG. 1B. The other uses foot pedals (like the ones in regular aircraft or rotorcraft) to proportionally control the rate of change of the fuselage azimuth. Both control methods use the FMS INS/GPS system to provide azimuth control independent of wind gusts. The azimuth control is fully protected by the FMS from exceeding safe operation limits. The rotor RPM and the propulsion are fully automatically controlled during flight without any mode of direct operator intervention.

The "Operator Guidance" controls, i.e., horizontal velocity, vertical velocity and azimuth controls are independent, so that any control which is not manipulated by the operator stays in automatic flight mode. Therefore, if the rotorcraft is flying automatically at 120 knots forward speed at a certain altitude and azimuth, the operator may use the right hand controller to re-trim to 135 knots without changing any other controls, or the operator may change the rotorcraft flight azimuth using the knob or pedals without touching any other controls.

In addition to the controls described above, the exemplary control unit incorporates two displays, screens or monitors 120, 122 as for example shown in FIG. 1A. In another exemplary embodiment, the control unit may incorporate a single display, screen or monitor.

Figure 3A:
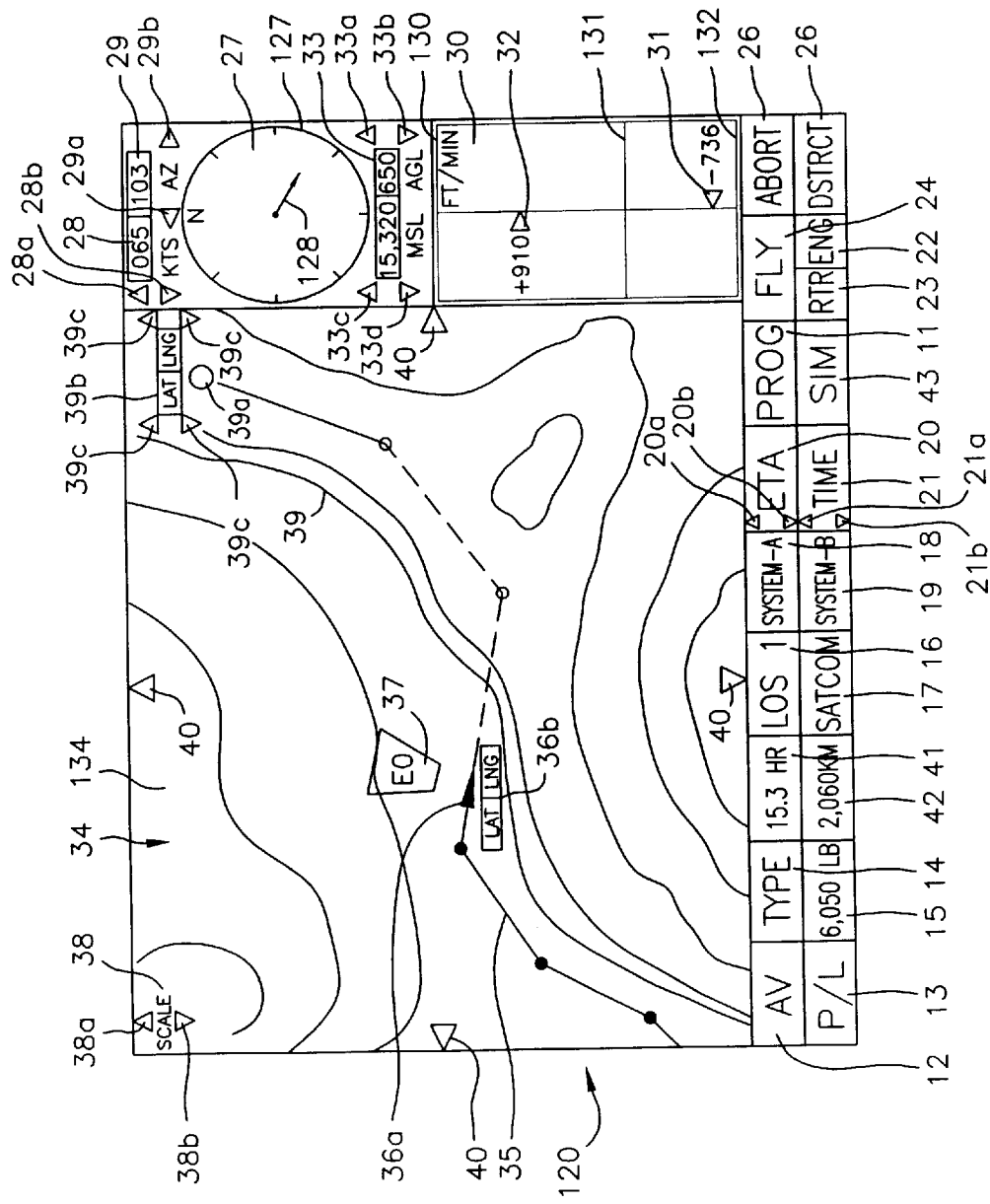
FIG. 3A depicts an exemplary display of the control system of the present invention used for controlling a rotorcraft.

FIG. 3A depicts the primary rotorcraft control display 120 incorporated in the exemplary embodiment control unit. In the exemplary embodiment, the operator can preprogram the rotorcraft for a completely autonomous flight from engine start before take-off to engine stop after landing, using the display in a computer screen mode and the right controller 110 for the same functions as the computer "mouse", except that the right controller cursor is centered at the center of the screen and is moved to any point on the screen against a centering spring, unlike a standard computer mouse action.

Figure 3B:
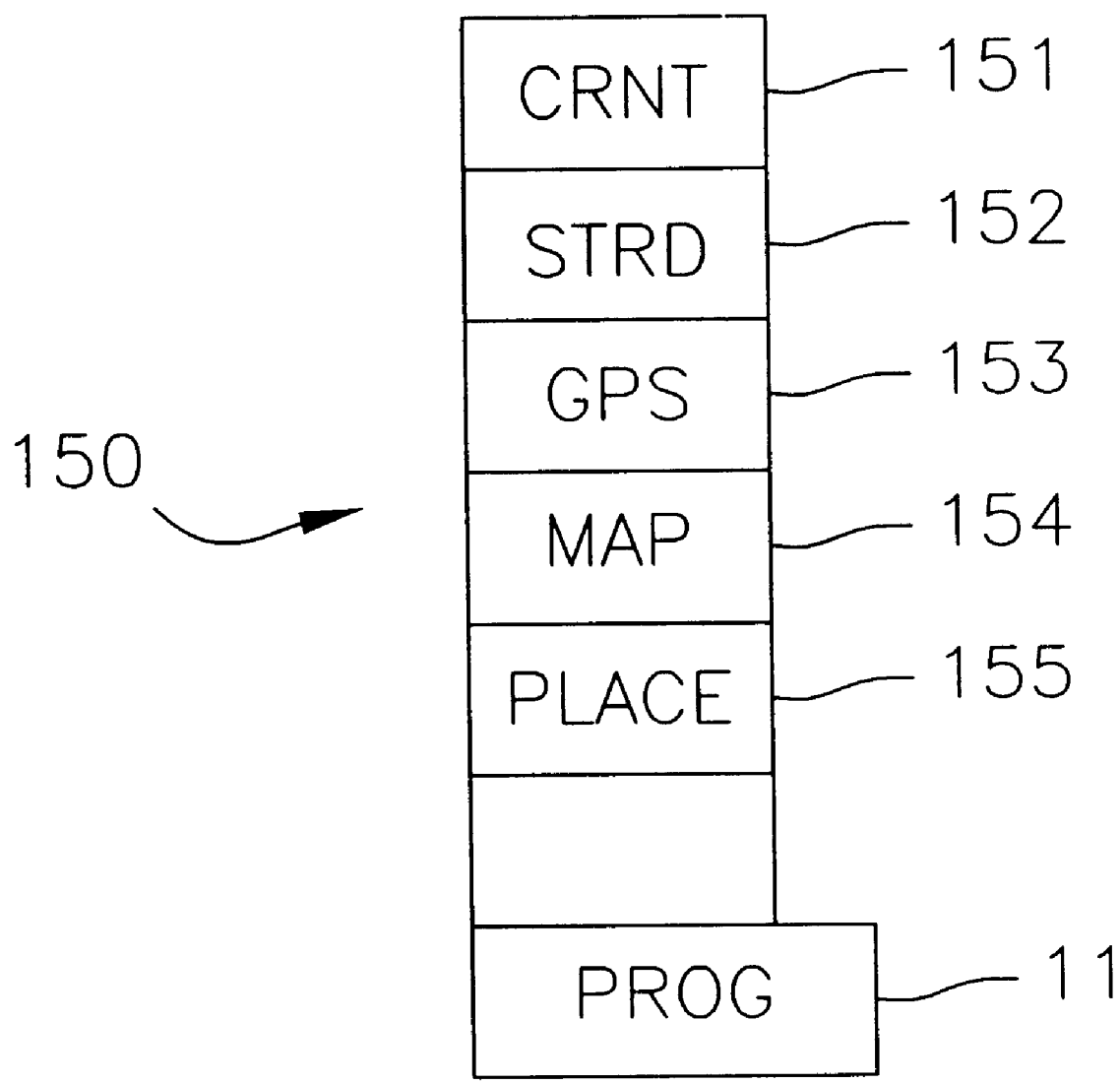
FIG. 3B depicts an exemplary menu activated when selecting the PROG window shown in FIG. 3A.

The following describes the operator actions for complete flight programming:

a. Using the right-hand controller (stick) 110, the operator moves the cursor to select Programming Mode by selecting a PROG window 11 on the screen. Selections using the right-hand controller occur in the exemplary embodiment by clicking on a switch, as for example switch 126 on the right-hand controller (FIG. 1A). When the PROG window is selected for programming, a menu 150 opens up having window 151 labeled "CRNT," window 152 labeled "STRD," window 153 labeled "GPS," window 154 labeled "MAP," and window 155 labeled "PLACE" (FIG. 3B);

i. By selecting CRNT using the right hand controller, the operator can reprogram any future flight way points of the flight plan being currently flown or being used for simulation, by selecting and dragging an existing way point as for example way point 39*a* to the appropriate location on map 134, or by using the cursor to enter the Latitude and Longitude coordinates of new way points using up/down arrows 39*c*;

ii. By selecting STRD, the operator can select from pre-programmed flight plans stored in the computer of the unit and use the selected flight plan as is or modify it as described hereafter.

iii. If the control unit is equipped with a numbered keypad, the operator can select GPS and specify the latitude and longitude of the location the operator wants to program from. The map of that location (if stored in the unit computer) will be displayed and the operator can use the map and curser method or use Latitude/Longitude Coordinating for continued programming as described hereafter;

iv. By selecting MAP, the operator can select stored maps and start preparing the flight plan using the cursor as describe hereafter;

v. the operator can select PLACE and using an alphanumeric keyboard, if so equipped, specify the flight starting place wanted;

b. The operator selects Air Vehicle (AV) programming by selecting an AV window 12 on the screen. AV is then lit. Selecting Payload Programming by selecting the P/L window 13 on the screen disables AV programming 12 and vise-versa;

c. Selecting a TYPE window 14 on the screen displays a window in the map display area with all types of AVs pre-programmed in the control unit. The operator selects the AV type from the list and the designation is displayed in the TYPE Window 14 (for example UH-60, F-16, etc.). The selection list window then disappears;

d. Selecting a Fuel Quantity window 15 displays all optional fuel quantities at the start of the flight of the particular rotorcraft type selected. The operator selects a level according to the fuel amounts actually on the AV (for example 1,400 lb.);

e. The operator selects Line Of Sight (LOS) radio communications by selecting an LOS 1 window 16 to be operational in a transmit/receive UAV data link mode or in a listen/receive only mode and at a particular frequency from a second level window (not shown);

f. By selecting a SATCOM widow 17, the operator selects the Satellite Communications (SATCOM) 17 to be operational. Not selecting SATCOM leaves the SATCOM window not lit;

g. The operator selects a Systems-A window 18, which presents a list of systems (example, landing gear up or down, navigation lights, etc.); the operator selects the systems to be operational;

h. The operator selects a System-B window 19 for other systems (example, cockpit or passenger cabin lights or temperature);

i. Selecting an Estimated Time of Arrival, ETA window 20 allows the operator, using up-down arrows 20a, 20b, to select the time of any particular flight leg;

j. Selecting a TIME window 21 allows the operator to adjust the current time using up/down arrows 21a, 21b;

k. Selecting an ENG window 22, RTR window 23 and FLY window 24 allows the operator to command the engine to operate, command the rotor to engage or disengage, and command the rotorcraft to fly or land, respectively;

l. Selecting an ABORT 25 window commands the rotorcraft to fly back to a pre-selected landing spot (or one to be selected from a list of alternates);

m. A DSTRCT window 26 provides an option unique to UAVs, such as unmanned rotorcraft. The DSTRCT window 26 should be selected only if terminating the flight immediately is preferred to any other option (for example, in case that any continuation of flight would increase the risk to people on the ground);

n. Selecting any point on a Horizontal Ground Speed Indicator window 27 displays a horizontal Velocity Vector, a ground speed in sub-window 28 and a Velocity Vector azimuth in sub-window 29. The circle perimeter 127 in window 27 represents the AV maximum airspeed. The size of the circumference 127 is adjusted to fit within the window 27. An arrow 128 depicts the direction of flight. The arrow 128 is sized proportionally to the ground speed of the vehicle and to the circumference 127. In this regard, if the arrow extends to the circumference 127, then the vehicle is flying at the maximum ground speed in the direction of the arrow.;

o. Using the up-down arrows 28a, 28b associated with window 28 the operator may adjust the ground speed. Using the left-right arrows 29a, 29b in window 29 the operator may adjust the azimuth;

p. The operator uses a Vertical Velocity Vector (rate of climb/descent in aviation vernacular) window 30 to program the desired rate for the specific segment of flight. The scale of display 30 is automatically set to present the maximum limits of rates of climb and descent for the particular AV. In other words, the upper bound 130 represents the maximum rate of climb. The bottom bound 132 represents the maximum rate of descent. The horizontal line 131 represents a zero rate of climb, i.e., no rate of climb. By pointing a commanded value arrow 31 and dragging it to the desired point within window 30 while observing the digitized value for better accuracy, the rate of climb or descent (i.e., negative rate of climb) can be selected. For example, by dragging the commanded value arrow above line 131 a positive rate of climb is selected. If the arrow is dragged to the upper bound 132 then the maximum rate of climb is selected. Similarly dragging the commanded value arrow 31 below line 131 a rate of descent is selected;

q. For any flight segment the operator may select an "altitude hold" mode by selecting either altitude above Mean Sea Level (MSL) or Above Ground Level (AGL) on window 33 or both, using the up-down arrows 33a, 33b or 33c, 33d. For example, selecting 15,320 MSL and 650 AGL in window 33 means "Fly at 15,320 ft above MSL but no lower than 650 ft AGL". In flight the altitude AGL is measured by a radar altimeter and the programming of altitude AGL can be used as a low performance "terrain following" flight mode;

r. The map section of the AV control screen window 34 displays the following on a background of the topographical area map:

i. Past, present and programmed AV flight path and way points 35;

ii. The AV current position in GPS 36a and in Latitude and Longitude 36b;

iii. The estimated payload fields of view on the ground 37; e.g. for Electro-Optical (EO);

iv. Current map scale 38 with arrows 38a, 38b for scale up/down;

v. Next leg of programming and its way point 39a in GPS and in Latitude and Longitude 39b, with up/down 39c arrows for changing the Latitude and Longitude;

vi. The display window 34 may be moved up, down, left or right to display a respective adjacent portion of the map 134 in increments by selecting the appropriate arrow 40. In the exemplary embodiment, selection of an arrow 40 moves the view in window 34 a half step increment in the direction of the arrow, i.e., it moves the view half a window.;

s. The operator may use either way point 39a on the map and Estimated Time of Arrival 20 to program any segment of flight (and review the resulting horizontal Velocity Vector displayed in window 27 and ground speed displayed in window 28) or use the information relating to the horizontal velocity vector from windows 27 and 28 and evaluate the way pont 39a and estimated time of arrival (ETA) 20.

t. For every programmed segment of flight the operator can review the amount of fuel remaining at the end of the segment (taking into account all fuel burnt from the start of the programmed flight) and can decide to modify the way point 39a (by dragging the way point to selected location or by changing the Latitude and Longitude using up/down arrows 39c), the ETA 20 or AV ground speed 28 to better suit the desired flight plan (longer range vs. earlier arrival). The remaining fuel is also displayed in terms of remaining flight endurance window 41 and ground range in window 42 (in hours and kilometers/miles/nautical miles) if the current flight parameters of speed, altitude, and azimuth are maintained.

u. After complete programming of the flight, the operator may unselect programming mode 11 and select a FLY window 24. When selecting FLY window 24 a sub-window (not shown) opens and requires the operator to select between "Program" and "Operator Guidance." If program is selected, the rotorcraft will start the engine and fly at the programmed time.

The unit may also be provided with portable or removable data storage, as for example a data disk. In such case, a flight plan may be programmed on another unit as saved on a disk. The disk may then be used to load the programmed flight plan to different units.

Most of the controls described above for preprogrammed flight operate in a similar way in Operator Guidance mode in which the operator can "fly" an aircraft with very little preprogramming or the operator can intervene at any stage during a preprogrammed flight. To fly, the rotorcraft in Operator Guidance mode, the operator selects the FLY window 24 and then selects "Operator Guidance."

a. In the most "manual" flight mode, the operator can only select the AV mode in window 12, AV type in window 14 and fuel level in window 15, adjust the clock in window 21 (if necessary), start the engine by selecting window 22, turn the rotor by selecting 23 and fly the rotorcraft by selecting window 24 without any prior programming. The rotorcraft will hover at its default altitude AGL which in the exemplary embodiment is about 10 ft. above the take-off point until the operator centers the trims on left- and right-hand controllers and, using a switch 120 on the right-hand controller, switches from cursor mode to hand controller mode, adjusts the desired rate of climb displayed in window 31 by moving forward-up the left controller, select the horizontal velocity trim (for hands-off cruise) with the right-hand controller and fuselage azimuth with the azimuth knob or foot pedals. The operator may, if so desires, switch the right-hand controller to cursor mode and select/unselect and adjust systems functions using. A complete flight can be guided in this "manual" mode with mostly "hands-off" (occasional azimuth changes) or full "hands and feet on" (pleasure flight, flight in dense traffic, etc.).

b. Unselecting the Fly mode at window 24 during flight provides for Return to Base (RTB) to a preprogrammed point (additional than programmed for Abort). Unselecting the Engine at window 22 stops the engine and, if done during flight, will result in automatic autorotation landing.

c. Unselecting the Rotor in window 23 will disconnect the engine and apply the rotor brake. The Rotor cannot be unselected in flight. But, this may become an option for controlling UAVs if the Destruct 26 mode will include pyrotechnics and if non-pyrotechnic AV destruction is desired.

d. The Abort mode which is selected in window 25 is usually programmed for mission abort and safe return to the take-off location or to another preprogrammed location where an automatic landing is possible. For a manned aircraft this mode can be valuable for safety of flight if the pilot is disoriented, feeling sleepy or feeling sick during a "manual" flight.

e. All mode selections are reversible in flight except the (UAV only) Destruct 26 and unselecting the Rotor 23 (as an optional feature).

f. The selection and unselection of Engine in window 22, Rotor in window 23, Fly in window 24, Abort in window 25 and Destruct in window 26 are key to AV safety and are protected by both full map-section displays providing warnings and requirements to make full stick movement and manual switch actions.

g. Selecting both Fly in window 24 and Programming in window 11 allows for programming during flight (during transit, loiter, hands-off cruise, etc.). Selecting both Fly in window 24 and Simulation SIM in window 43 allows for checkout of a new program during flight. Simulation in window 43 can be selected to "computer fly" the AV at accelerated pace while observing all AV limitation for the real-time program.

h. When not actively used for controlling an AV in flight, the control unit when in Simulation mode provides a full training simulator.

Application to Imaging Payload

One of the most difficult machines to operate are rotorcraft imaging payloads, especially if operated by one person, comprising 3-axis or 4-axis gimbaled stabilized Electro-Optical (EO) and Infra-Red (IR) imaging sensor. Operation of the imaging sensor usually includes the following continuously manipulated controls:

a. Elevation angle of the gimbal system—from above the horizon down to nadir;

b. Azimuth angle of the gimbal system—continuous 360°;

c. Continuous zoom of the EO (color TV) camera lens;

d. Continuous zoom (or 2–3 discrete focal lengths) of the IR camera;

e. EO camera focus (if not automatic).

In addition, the EO/IR payload controls include many discrete controls such as selecting:

a. EO or IR camera;

b. Contrast tracker—for automatic following of a certain object; and c. Laser range finder/designator, if so equipped.

Figure 4:
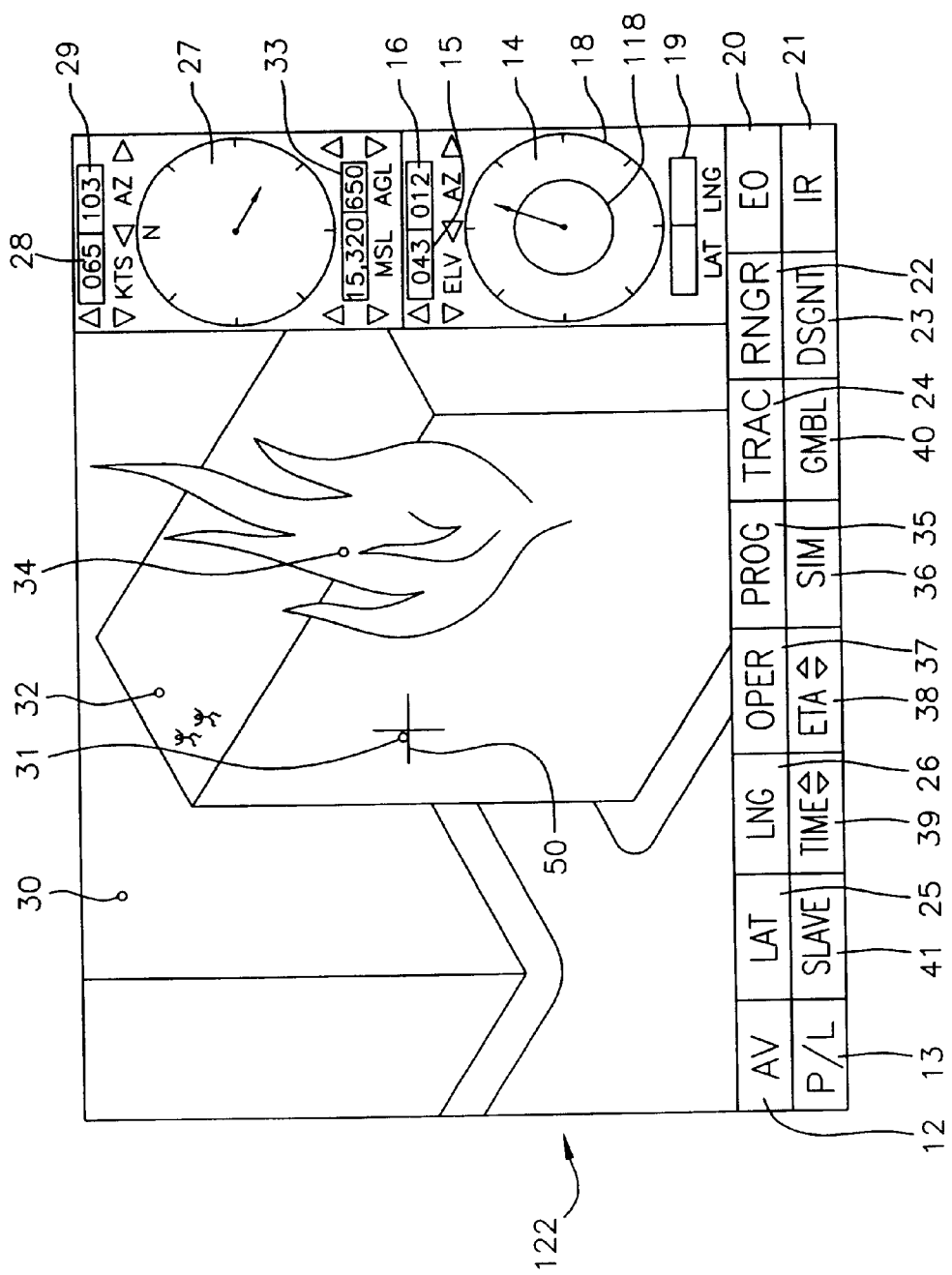
FIG. 4 depicts an exemplary display of the control system of the present invention used for controlling an EO/IR imaging payload.

Using the present invention, the controls of the EO/IR imaging payload (as for example shown in FIG. 4) are made as close as possible to those for the rotorcraft, in order to minimize the operator's required training and the possible confusion if operation of both rotorcraft and payload by the same operator is desired, either as a single operator of the complete system or for "cross-training" so that AV operators can control payloads and vise-versa. Furthermore, the same modes of operation as in the AV control case also provide for programming the payload for completely automatic operation, for simulation and for training. With reference to FIG. 4 which depicts the second or payload display 122 incorporated in the exemplary embodiment unit 100:

a. The upper right corner of the displays 27, 28, 29 and 33 for EO/IR payload control are identical to those of the AV control display;

b. The lower left corner displays 12 and 13 are also identical and provide for selection of AV control window 12 vs. payload control window 13;

c. When the right-hand controller 104 is in the cursor mode, the operator may control the EO/IR gimbal angles using the graphic display 14 and the digital displays 15 and 16 in the same way the horizontal Velocity Vector control works in the AV control mode, except that the control of the gimbal is of azimuth and elevation;

d. A fixed circle 18 provides a graphic display of the maximum wide angle available. A variable diameter circle 118 concentric to the fixed circle provides a graphic display of the zoom angle. The two circles 18 and 118 provide a graphic display of the zoom angle vs. the maximum wide angle available;

e. The GPS location of the impact point on the ground of the EO/IR gimbal boresight are displayed (in Latitude, Longitude) in windows 19;

f. Momentary (spring loaded) push switches 124, 126 on the left- and right-hand controllers (FIG. 1A) select between EO camera display and IR camera display, activate the laser ranger, the laser designator and the automatic gimbal tracking of an image on the gimbal boresight. These selections and activations are displayed on windows 20–24 and they work the same whether the right-hand controller is in cursor or real-time control mode;

g. The selections of programming mode in window 35 and simulation mode in window 36 are identical to those in AV control and the selection of direct (real-time) control of the payload operation in window 37 is similar in function to the selection of Fly mode in the AV control;

h. The Estimated Time of Arrival in window 38 and current time in window 39 functions are identical to those in the AV control; and i. The AV position is displayed Latitude and Longitude in windows 25 and 26, respectively.

The operator may program the operation of the payload before flight or during flight using programming mode in window 35 and may check the program by using the simulation mode in window 36. The simulation may include simulated color TV-type display in the picture section 30 for operator training purposes.

The operator may select the Gimbal (GMBL) window 40 either during flight or on the ground. This will power the EO/IR payload in real-time or simulation mode 36, or if programming mode in window 35 is selected it will program for such power-on at the programmed ETA 38. If GMBL in window 40 is selected and OPER is selected in window 37, real-time EO/IR operation in flight or on ground is provided.

A selection of EO camera in window 20 will display the color TV camera picture in the picture section 30. The selection of IR in window 21 displays the infra-red camera picture in the picture section 30.

If a rotorcraft operator or UAV operator is for example called to a site of a high rise building fire, the operator may, very early in the flight, "scan the horizon" with the EO/IR payload using the right-hand controller and select the tracker (TRAC) in window 24 to lock on the smoke 34 emitted from the fire using the EO camera or heat emitted from the fire using the IR camera. When the rotorcraft, or UAV, is close to the scene the operator may use the right-hand controller to guide the boresight "cross-hair" 50 to a particular point, like a person calling for help from a window 31 or a possible landing spot to rescue people on the roof 32 and select the tracker in window 24 for automatic "hands-off" tracking of the selected spot.

The camera zoom is controlled by the left-hand controller. Moving the controller aft-down gives a wider field of view ("zoom out") and moving the controller forward-up gives a narrower field of view ("zoom in"). The focus is automatically controlled in all modes, using data from a laser range finder/designator.

Application to Rotorcraft And Payload

The above description demonstrates how the control of two very different types of complex machines or vehicles can be made very similar and intuitive. Furthermore, the method of providing for automatic, Operator Guidance and simulation/training modes is identical.

While the present invention is applicable to the operation of the rotorcraft by one operator and the operation of the EO/IR payload by another operator, it vastly reduces the workload of both operators which makes possible the operation of both by a single operator as follows:

a. The control unit includes both AV and EO/IR payload display screens 120, 122 described above, as shown FIG. 1A. In an alternate exemplary embodiment, incorporating a notebook size unit the EO/IR payload display takes the position of the standard notebook screen and the AV display takes the position of the notebook keypad (no keypad is required for the present invention and the operator does not need to be versed with computer operation or be competent in spelling in English or other language);

b. The operator uses the right-hand controller in cursor mode to select either AV control in window 12 or payload control in window 13 on either screens (default position when the control unit is powered up is AV control);

c. For a programmed autonomous flight, the operator may start with programming the complete AV flight or the complete payload programming or may program each flight segment by first programming the AV flight for the segment and then the payload operation. The operator can then check the complete program using simulation mode, both screens will simultaneously show the simulated AV and payload operation;

d. The operator may elect to use autonomous AV flight mode and operate the payload in Operator Guidance mode. In such case, while the operator control actions are exclusively for payload control, the full monitoring of the AV systems and flight path is continuously provided by the AV screen, and the operator can, at any time, switch to AV control by selecting the AV window 12 in the input active screen, in this case the payload screen 120, modify the AV flight path or AV systems operations to best suit the payload operation or to best suit the changing situation during flight. When the operator selects the AV window 12, the AV screen is activated for input. With exemplary embodiment, while both screens 120 and 122 may be simultaneously on for providing information, only one screen can be active at a time for accepting input from the operator;

e. The upper right corner of the payload display, being common with that of the AV display, provides for substantial control of the AV flight path without the operator switching from payload control in window 13 to AV control in window 12 the input active screen. Also, the fact that the AV fuselage azimuth control (both control knob and foot pedals, if so equipped) has no similar function/use in payload control, provide for such AV control while the operator is in payload control mode;

f. The fact that even in Operator Guidance modes both AV and payload operations are automated to a high level of automation and the AV flight safety is provided by many flight limits "protection" functions (speed, maneuver, altitude AGL, low fuel, etc.) offers a well trained operator the option of operating both AV and payload in Operator Guidance mode with very little, if any, programming prior to the start of flight. Such operation may start by flying the AV in Operator Guidance mode to the preferred cruise condition, switching to payload control 13, and continuing the flight in the payload control mode using the AV control functions in that mode until the end of the flight when the operator may switch back to AV control 12 for landing;

g. The high level of integration and commonality between AV control and payload control modes, makes easy and intuitive some of the most complex AV operations usually requiring two well trained operators with intense real-time coordination. Instead, a reasonably trained AV/Payload operator can, for example, lock the payload tracking function on any point (the roof landing spot 32 on the payload display), slave the AV flight path to the payload boresight using Slave mode 41, and command the AV altitude 33 to zero AGL, for automatic landing on the roof, while still manipulating the payload to change the landing spot to avoid the smoke, the fire or personnel on the roof;

h. While the dual-screen control unit described above is the preferred method and provides the most necessary information to the operator, the above-described system can also be used with a single-screen unit. In such case the single screen will change from AV display to payload display when the operator selects payload control 13. Furthermore, the dual-screen unit automatically switches to the single-screen mode in the rare occasion of screen or electronic control failures which render one screen inoperative.

Application to Fixed-Wing Aircraft

The control of a fixed-wing aircraft is substantially simpler than that of a rotorcraft because the aircraft flies only forward "nose first" and it takes off and lands on a straight adequately prepared runway or landing strip in locations usually designated for such aircraft operations.

The continuously manipulated flight-safety critical controls of a manually controlled aircraft are:

a. Elevator which deflects aerodynamic control surfaces to create a pitch moment of aircraft nose-up or nose down and as a result aircraft angular acceleration in that direction. The indirect result is pitch attitude change, change of the lift on the wing and linear acceleration of the total aircraft up or down;

b. Aileron which deflects aerodynamic control surfaces to create roll moment around the fuselage axis, the angular acceleration indirectly results in a roll position of right wing higher or lower than the left wing thereby tilting the wing lift vector and creating a lift component which accelerates the total aircraft to the left or right;

c. Rudder which deflects aerodynamic control surfaces to create yaw moment, the angular acceleration turns the fuselage nose-right or nose-left and thereby controls the aircraft motion in cross-flow (side-slip in aviation vernacular) coming from the left, from the right or straight along the fuselage. In the vast majority of the flight conditions the desired rudder position is that which produces zero cross-flow;

d. Throttle which controls the engine power or forward thrust.

Even though the aircraft is much simpler to operate than a rotorcraft, it is vastly more complex to operate than an automobile. Even the simplest aircraft has a substantial list of displays (dedicated meters and lights) and controls (dedicated switches and multi-position selectors) other than the above listed controls such as propeller pitch/RPM, engine mixture control, landing gear retract, landing flap position, etc. As a result, the minimum skill and training levels required for a simple aircraft pilot are substantially higher than those for driving an automobile.

In order to reduce aircraft piloting workload, the more expensive aircraft use autopilots which provide virtual "handsoff" operation once the aircraft is cruising at the desired altitude, speed and heading. Some advanced autopilots even provide for automatic landing. But, none of these autopilots changes the pilot's basic interface with the aircraft. One glance at the very complex cockpit instrumentations and controls of a modern transport jet proves that the advanced autopilots leave the pilot in direct monitoring and command of all aircraft controls and subsystems.

The control of a fixed-wing aircraft is very different from the control of a rotorcraft, although both of these AVs share the fact of being heavier-than-air machines flying in a mass of air. This control difference results from the fact that the key controls of the rotorcraft directly control the lift producing rotor blades of the main and tail rotors; but, the controls of the fixed-wing aircraft aim at changing the angles of the whole aircraft in its trajectory vs. the mass of air and thereby change the resulting lift and drag vectors on the aircraft, resulting in linear accelerations of the aircraft which changes the aircraft flight path and speed.

The present invention provides an operator-machine interface for the control of the aircraft which is almost identical to that for the rotorcraft and also provides a vastly reduced operator workload. Except for the minor variations listed below, all controls and displays for the aircraft will be identical to those for the rotorcraft, therefore the following description will refer to the same FIG. 3A:

a. All hand- and foot-controllers functions are identical to those for the rotorcraft. When the aircraft is moving on the ground (taxi before take-off or after landing) the right-hand controller functions the same as in rotorcraft control. But, when the AV is airborne, the right-hand controller center position commands the aircraft to minimum ground speed in any azimuth instead of the rotorcraft zero ground speed (hover). The minimum ground speed is continuously computed based on current vehicle weight, commanded maneuver level, air density and wind magnitude and direction. While the FMS hardware and software on board the AV protects the AV from flying at an airspeed below that for minimum control, the above limitation of minimum ground speed computed in the control unit avoids, in most cases, the unit commanding too low a speed and creating a gap between commanded (programmed, simulated or real-time commanded) speed and AV real executed flight path and ETA.

b. Using the present invention, the fixed-wing aircraft is controlled very differently from the standard aircraft manual control currently in use. Pushing the right-hand controller (stick) forward does not push the nose down and put the AV into a diving path, but increases the forward speed while maintaining the current commanded altitude or rate of climb, which requires higher commanded throttle, not nose down attitude. Also there is no direct control of throttle, the left-hand controller is used for rate of climb/descent and for altitude hold (center indent) and therefore has more effect on AV nose attitude (up or down) than the right-hand controller has. This and other control functions (for example, pedals, if so equipped, control the rate of change of azimuth and not rudder position) substantially reduce the need for specialized "piloting" skills and training. For example, the operator does not need to know how to avoid hitting the ground when increasing the forward speed of the AV because maintaining altitude AGL, airspeed, azimuth or the rates of change of these parameters is performed automatically by the FMS at preset flight safety related prioritization for the case of a conflict between these automatic controls.

c. The displays of FIG. 2 will be identical, except that the rotor function displayed in window 23 will not be used or will change to a propeller control function, if so equipped.

As can be seen the present invention provides an operator/machine interface for operating vehicles and machines capable of automatic operation which minimizes the operator's work load, training and skill level required to operate such vehicles and machines. The operator/machine interface is the same for different types of machines and vehicles of comparable control complexity, e.g., fixed wing vehicles and rotorcraft, regardless of the type of machines or vehicles and regardless if the operator is on, near or far from the machine or vehicle being operated. The inventive interface is also similar or identical when the operator programs the operation of the machine or vehicle for future operation to the interface during real time operation.

The term "different type" as used herein in relation to vehicles or machines should be interpreted to mean different as to the type of vehicle or machine operation. For example operation of a fixed wing aircraft is different from the operation of a rotorcraft. As such, a fixed wing aircraft should be considered a different type of vehicle from a rotorcraft. Similarly, a gimbaled imaging payload operation is different from the operation of a rotorcraft. Thus, gimbaled payload is a different type of machine than a rotorcraft. On the other hand a regional turboprop transport aircraft is the same type as a Boeing 747. Moreover, the operation of a fixed wing manned vehicle is different than the operation of a fixed wing unmanned vehicle. As such, fixed wing manned and unmanned vehicles are also considered different types of vehicles With this invention, however, the control and programming of a fixed wing manned vehicle is the same as the operation of a fixed wing unmanned vehicle.

Although the present invention has been described and illustrated with respect to various exemplary embodiments thereof, it is to be understood that it is not so limited, since changes and modifications may be made therein which are within the full intended scope of this invention as herein after claimed. For example, the windows in the various screens may be arranged differently and/or labeled differently than disclosed herein without effecting the scope of the present invention. Furthermore, the left stick may be made to have the functions of the right stick and vise versa. Moreover, instead of a stick, other input controls or controllers and input devices may be used, as for example a computer mouse or a touch screen. As such, the terms "input control" and "input controller" as used herein should be interpreted to encompass all types of different input devices. In addition, the displays may be provided as heads up displays on the vehicles or machines being operated, or heads up displays on an operator's head set.

What is claimed is:

1. A control system interface for programming and controlling the operation of a plurality of different types of devices at different times, wherein each device is selected from the group consisting of manned vehicles and machines capable of automated operation, unmanned vehicles and machines capable of automated operation, and machines including payloads carried by such vehicles, the interface coupled to the device being controlled or programmed and comprising:
    a first display displaying information pertinent to the control of the operation of any desired device of said plurality of devices; and
    at least one input control for providing input for programming the system for completely automated control of said desired device, and wherein the at least one input control can provide input for manual control of the desired device.

2. A control system interface as recited in claim 1 wherein the display and the at least one input control are housed in a portable unit, wherein the portable unit is releasably coupled to an automated control system of the desired device.

3. A control system interface as recited in claim 2 wherein the unit can be releasably coupled to a rotorcraft to control the operation of the rotorcraft and to an aircraft to control the operation of the aircraft.

4. A control system interface as recited in claim 3 wherein the unit is releasably coupled to a flight management system of said rotorcraft and aircraft.

5. A control system interface as recited in claim 2, wherein the unit is programmable to provide complete automated control of the at least one machine prior to being coupled to the unit.

6. A control system interface as recited in claim 2 further comprising a rotating knob for controlling yawing of the device.

7. A control system interface as recited in claim 1 wherein the interface can control simultaneously a first device selected from the group consisting of manned and unmanned vehicles capable of automatic control, and a second device consisting of payloads carried by the selected device.

8. A control system interface as recited in claim 7 further comprising a second display, wherein the first display provides information relating to the operation of the first device and the second display provides information relating to the operation of the second device.

9. A control system interface as recited in claim 8 wherein the two displays and the at least one input control are housed in a portable unit releasably coupled to the at least one display.

10. A control system interface as recited in claim 1 wherein the interface provides controls for a plurality of device operation parameters, wherein a selected parameter is controlled manually using one of the input controls while the remaining parameters are controlled automatically.

11. A method for programming and controlling the operation of multiple different types of devices, wherein each device is selected from the group consisting of manned vehicles and machines capable of automated operation, unmanned vehicles and machines capable of automated operation, and machines including payloads carried by such vehicles, the method comprising:

creating common controls for the different types of devices to be programmed and controlled;

controlling or programming related functions of the different types of devices using the same controls; and controlling or programming the operation of a control system of a desired device of said multiple devices using said controls.

12. A method as recited in claim 11 further comprising providing at least one display to display information relating to the desired device.

13. A method as recited in claim 12 further comprising providing the information displayed in common graphics format for the different types of devices.

14. A method as recited in claim 12 further comprising:

providing the common controls and the at least one display in a unit; and coupling the unit to the desired device.

15. A method as recited in claim 14 wherein the unit can be coupled to desired device, wherein the desired device is an aircraft and wherein the same unit can be coupled to a second desired device, wherein the second desired device is a rotorcraft for controlling and programming the operation of said aircraft and rotorcraft.

16. A method as recited in claim 15 further comprising coupling the unit to a flight management system of the rotorcraft or aircraft whose operation is being controlled or programmed.

17. A method as recited in claim 12 wherein the unit is portable, the method further comprising releasably coupling the unit to a device to be controlled.

18. A method as recited in claim 12 wherein each device to be controlled comprises an automated system for providing for automated operation of the device, the method further comprising coupling the common controls and the at least one display to the automated system of the device whose operation is to be controlled or programmed.

19. A method as recited in claim 18 further comprising:

manipulating the controls for controlling or programming the operation of the device; and generating information relating to the manipulated control;

sending the information to the automated system; and controlling the vehicle using the automated system in response to the information received.

20. A method as recited in claim 11 wherein controlling or programming the operation of a device comprises:

controlling or programming the operation of one device using said controls during a first time interval; and controlling or programming the operation of another device using said controls during a second time interval different from the first time interval.

21. A control system as recited in claim 1, wherein the different types of devices comprise a first device having a first control system and a second device having a second control system operationally different from the first control system.

22. A method as recited in claim 11, wherein the different types of devices comprise a first device having a first control system and a second device having a second control system operationally different from the first control system.

23. A control system interface for programming and controlling the entire operation of a desired device selected from the group of devices consisting of manned vehicles and machines capable of automated operation, unmanned vehicles and machines capable of automated operation, and machines including payloads carried by such vehicles, the interface removably coupled to the device being controlled or programmed and comprising:

a first display displaying information pertinent to the control of the operation of any desired device of said plurality of types of devices; and at least one input control for providing input for programming the system for completely automated control of said desired device, and wherein the at least one input control can provide input for manual control of the desired device.

24. A method for controlling the operation of a plurality of devices selected from the group of devices consisting of manned vehicles and machines capable of automated operation, unmanned vehicles and machines capable of automated operation, and machines including payloads carried by such vehicles, the method comprising:

providing a unit having common controls for the plurality of devices to be controlled;

controlling related functions of said plurality of devices using common controls;

coupling the unit on a first of said plurality of devices;

controlling the operation of said device of said plurality of devices using said common controls on said unit by manipulating the controls to provide a set of inputs;

coupling the unit a second device of said plurality of devices; and controlling the operation of said second device of said plurality of devices using said common controls on said unit.

* * * * *